(12) United States Patent
Brooks et al.

(10) Patent No.: US 12,441,405 B2
(45) Date of Patent: Oct. 14, 2025

(54) ENERGY ABSORBING SIDE RAIL

(71) Applicant: FLEX-N-GATE ADVANCED PRODUCT DEVELOPMENT, LLC, Warren, MI (US)

(72) Inventors: Geoffrey Brooks, Macomb, MI (US); Steve Perucca, Clinton Township, MI (US); Robert L. Fontichiaro, Saline, MI (US); John Chiang, Commerce Township, MI (US); Paul Martini, Tecumseh (CA); Derek Bezaire, Amherstburg (CA); Aaron Boyer, Washington, MI (US)

(73) Assignee: FLEX-N-GATE ADVANCED PRODUCT DEVELOPMENT, LLC, Warren, MI (US)

( * ) Notice: Subject to any disclaimer, the term of this patent is extended or adjusted under 35 U.S.C. 154(b) by 259 days.

(21) Appl. No.: 17/743,211

(22) Filed: May 12, 2022

(65) Prior Publication Data

US 2022/0363316 A1     Nov. 17, 2022

Related U.S. Application Data

(60) Provisional application No. 63/188,890, filed on May 14, 2021.

(51) Int. Cl.
*B62D 21/15*     (2006.01)
*B60K 1/04*     (2019.01)
(Continued)

(52) U.S. Cl.
CPC ......... *B62D 21/157* (2013.01); *B62D 25/025* (2013.01); *B62D 25/2036* (2013.01); *B60K 2001/0438* (2013.01)

(58) Field of Classification Search
CPC ............. B26D 21/157; B26D 25/2036; B26D 25/025; B60R 2021/0006;
(Continued)

(56) References Cited

U.S. PATENT DOCUMENTS 6,179,355 B1 *   1/2001   Chou ...................... B60R 19/18
                                                              293/121
6,746,061 B1 *   6/2004   Evans ..................... B60R 19/18
                                                               293/122
(Continued)

FOREIGN PATENT DOCUMENTS

| EP | 3 747 736 A1 | 12/2020 |
|---|---|---|
| JP | 2003-267260 A | 9/2003 |
| JP | 2018-066435 A | 4/2018 |

OTHER PUBLICATIONS

Extended European Search Report issued in connection with EP Appl. Ser. No. 22173380.1 dated Feb. 11, 2022.
(Continued)

*Primary Examiner* — Daniel J Colilla
(74) *Attorney, Agent, or Firm* — FOLEY & LARDNER LLP

(57) ABSTRACT

An energy absorbing side rail including an inner rail, an outer rail fixedly coupled to the inner rail defining a cavity, the outer rail defining triggers extending along at least a portion of the outer rail, and at least one energy absorber housed in the cavity, wherein at least one energy absorber is positioned in-line with the triggers.

18 Claims, 4 Drawing Sheets

(51) Int. Cl.
*B62D 25/02* (2006.01)
*B62D 25/20* (2006.01)

(58) Field of Classification Search
CPC ...... B60R 2019/1813; B60R 2019/182; B60R 2019/1826; B60R 19/18; B60K 2001/0438
See application file for complete search history.

(56) References Cited

U.S. PATENT DOCUMENTS

| | | |
|---|---|---|
| 8,608,230 B2 | 12/2013 | Young et al. |
| 10,363,966 B2 | 7/2019 | Ando et al. |
| 10,483,510 B2 | 11/2019 | Stephens et al. |
| 10,720,620 B1 | 7/2020 | Grace et al. |
| 10,850,774 B2 | 12/2020 | Amrit et al. |
| 2010/0109385 A1 | 5/2010 | Yamada et al. |
| 2018/0009481 A1 | 1/2018 | Lee et al. |
| 2019/0185071 A1* | 6/2019 | Choi .................... B62D 25/025 |
| 2019/0256152 A1* | 8/2019 | Ranga .................. B62D 25/025 |
| 2019/0300073 A1 | 10/2019 | Suzumura et al. |
| 2019/0308669 A1 | 10/2019 | Aitharaju et al. |
| 2021/0039718 A1 | 2/2021 | Koga et al. |
| 2021/0188071 A1* | 6/2021 | Matecki .............. H01M 50/204 |
| 2022/0006151 A1* | 1/2022 | Foran .................... H01M 50/24 |
| 2022/0126664 A1* | 4/2022 | Caliskan ............ B62D 25/2036 |
| 2022/0250565 A1* | 8/2022 | Godthi .................... F16F 7/121 |
| 2022/0320659 A1* | 10/2022 | Munjurulimana .. H01M 50/249 |
| 2023/0420778 A1* | 12/2023 | Seok .................. H01M 50/244 |

OTHER PUBLICATIONS

Office Action issued in EP Appl. No. 22173380.1 dated Jun. 30, 2025.

* cited by examiner

ENERGY ABSORBING SIDE RAIL

CROSS-REFERENCE TO RELATED PATENT APPLICATION

This application claims the benefit of and priory to U.S. Provisional Application No. 63/188,890, filed on May 14, 2021, the entire disclosure of which is hereby incorporated by reference herein.

BACKGROUND

The present application relates generally to the field of side rails and side rail assemblies for vehicles such as automobiles and the like. More specifically, the present application relates to energy absorbing side rail assemblies.

SUMMARY

At least one embodiment relates to an energy absorbing side rail. The energy absorbing side rail includes an inner rail, an outer rail fixedly coupled to the inner rail forming a cavity, the outer rail defining triggers extending along at least a portion of the outer rail, and at least one energy absorber housed in the cavity. The at least one energy absorber is positioned in-line with the triggers.

In some embodiments, the at least one energy absorber is formed of a plastic.

In some embodiments, in the at least one energy absorber is formed of a polyphenylene ether and polyamide blend.

In some embodiments, the inner rail and the outer rail are formed of martensitic steel.

In some embodiments, the inner rail and the outer rail are formed of aluminum.

In some embodiments, the outer rail comprises a top portion, a bottom portion, and an outside portion.

In some embodiments, the triggers are defined on the bottom portion and the top portion.

In some embodiments, the inner rail defines a channel configured to receive the at least one energy absorber.

Another embodiment relates to an energy absorbing side rail assembly. The assembly includes a vehicle, an inner rail coupled to the vehicle, an outer rail coupled to the inner rail forming a cavity, the outer rail defining triggers extending along at least a portion of the outer rail, and at least one energy absorber housed in the cavity and coupled to the inner rail. The at least one energy absorber is positioned in-line with the triggers.

In some embodiments, the inner rail is coupled to the vehicle mechanically.

In some embodiments, the inner rail is coupled to the vehicle chemically.

In some embodiments, the inner rail conforms to the shape of a vehicle component of the vehicle.

In some embodiments, the vehicle component is a battery box.

In some embodiments, the inner rail is coupled to the battery box.

Another embodiment relates to a method of forming an energy absorbing side rail. The method includes forming an inner rail and an outer rail, forming at least one energy absorber, assembling the inner rail and the outer rail to form a cavity, and positioning at least one energy absorber within the cavity to form an energy absorbing side rail.

In some embodiments, the method includes coating the energy absorbing side rail to form a coated energy absorbing side rail.

In some embodiments, coating the energy absorbing side rail includes electrostatic coating.

In some embodiments, forming the inner rail and the outer rail includes roll forming.

In some embodiments, wherein forming the at least one energy absorber includes injection molding.

In some embodiments, the method includes coupling the energy absorbing side rail to a vehicle component.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numbers refer to like elements, in which.

It will be recognized that some or all of the figures are schematic representations for purposes of illustration. The figures are provided for the purpose of illustrating one of more implementations with the explicit understanding that they will not be used to limit the scope of the present disclosure.

DETAILED DESCRIPTION

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting. Below are more detailed descriptions of various concepts related to, and implementations of, methods, apparatuses, and assemblies for energy absorbance. The various concepts introduced above and discussed in greater detail below may be implemented in any of a number of ways, as described concepts are not limited to any particular manner of implementation. Examples of specific implementations and applications are provided primarily for illustrative purposes.

Generally speaking, side rails are used to absorb energy in the event of a collision to protect critical vehicle components or passengers. For applications of side rails on a vehicle, the side rail is often built to absorb impact without substantially increasing vehicle weight. Thus, it may be desirable to provide a side rail that maximizes energy absorption and minimizes weight.

Referring generally to the FIGURES, disclosed herein is an energy absorbing side rail (e.g., impact absorber, etc.) for vehicles (e.g., automobiles, etc.). The energy absorbing side rail may be used for any vehicle type (e.g., sedan, sport-utility, etc.). The energy absorbing side rail may be configured to protect various vehicle components (e.g., battery enclosure, fuel tank, etc.) from a side collision.

Still referring generally to the FIGURES, the energy absorbing side rail may be formed to protect a specific vehicle component. Advantageously, in one embodiment, the inside rail and the outside rail of the energy absorbing side rail are made of roll formed metal. Roll forming allows for tuning that can be optimized to best protect the desired component through specific geometry or thicknesses. Additionally, making inside rails and outside rails out of roll formed metal reduces the cost, weight, and complexity of manufacturing. The plastic energy absorbers may be injection molded such that thicknesses and geometry can be tuned to optimize energy absorption to protect the desired component. Additionally, plastic energy absorbers are lightweight.

Figure 1:
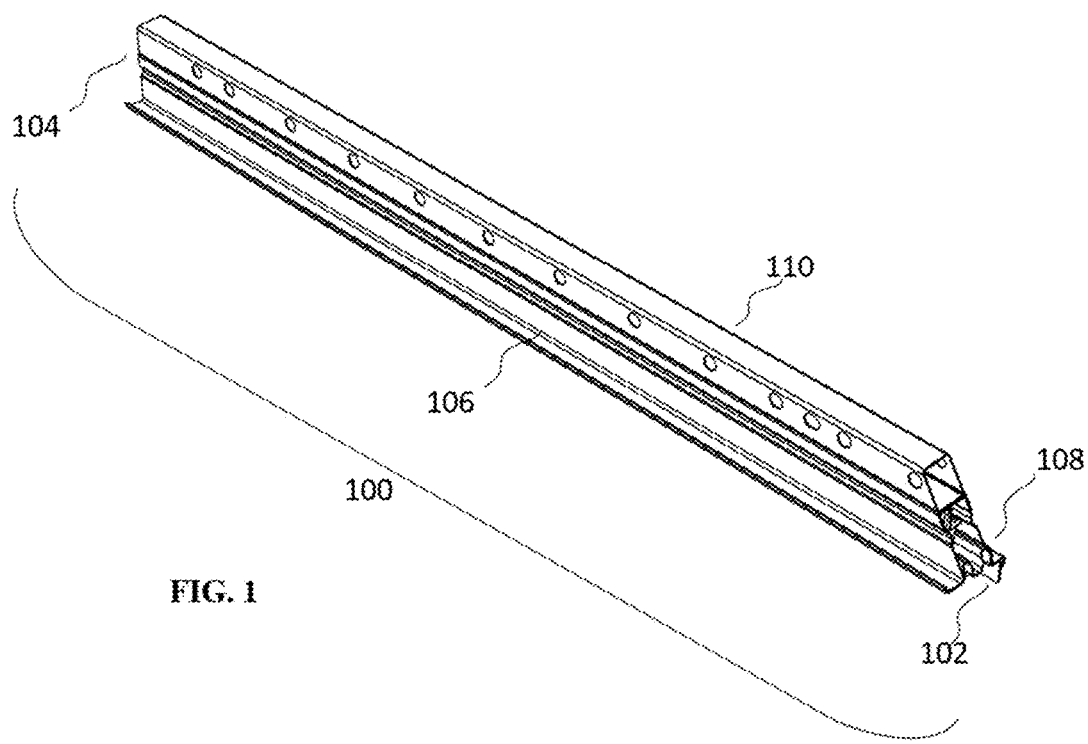
FIG. 1 is an isometric view of an energy absorbing side rail according to an exemplary embodiment.

FIG. 1 depicts an energy absorbing side rail assembly 100 according to one embodiment. The energy absorbing side rail assembly 100 is configured to couple with a vehicle or to a component of the vehicle. The purpose of the energy absorbing side rail assembly 100 is to absorb energy from a side impact. Side impact tests, and more specifically, side pole impact tests are standard measures used by the Insurance Institute for Highway Safety in determining vehicle safety. Side pole impact tests distribute impact pressure over a much smaller area than standard side impact tests, thus exerting a greater force on the vehicle. The energy absorbing side rail assembly 100 is configured to provide certain protection against impacts such as side pole impacts for vehicle components such as an electric vehicle battery box, which can combust if damaged.

In some embodiments, the length and size of energy absorbing side rail assembly 100 may be modified to adapt to a specific application. This allows for the energy absorbing side rail assembly 100 to be mounted on various vehicle types and sizes (e.g., van, sport-utility vehicle, etc.). Varying the size and length also allows for the energy absorbing side rail assembly 100 to be configured according to how much protection is needed, thus protecting the component adequately and avoiding excess weight. Varying the size and length of the energy absorbing side rail assembly 100 also allows for it to be modified to fit onto a variety of vehicle components (e.g., battery boxes, fuel tanks, etc.).

In some embodiments, the energy absorbing side rail assembly 100 may be electrostatically coated. Electrostatic coating uses charged particles to coat a work-piece. The work-piece is electrostatically charged and dipped into a tank of electrostatically charged paint. The work-piece is then removed leaving a layer of electrostatically bonded paint on the work-piece. The work-piece is then baked so that the paint dries. Electrostatic coating has the benefit of adhering to the work-piece well and being difficult to remove. An additional benefit of electrostatic coating is that the work-piece can be coated with a paint having other benefits (e.g., corrosion resistance, oxidation resistance, etc.).

Figure 2:
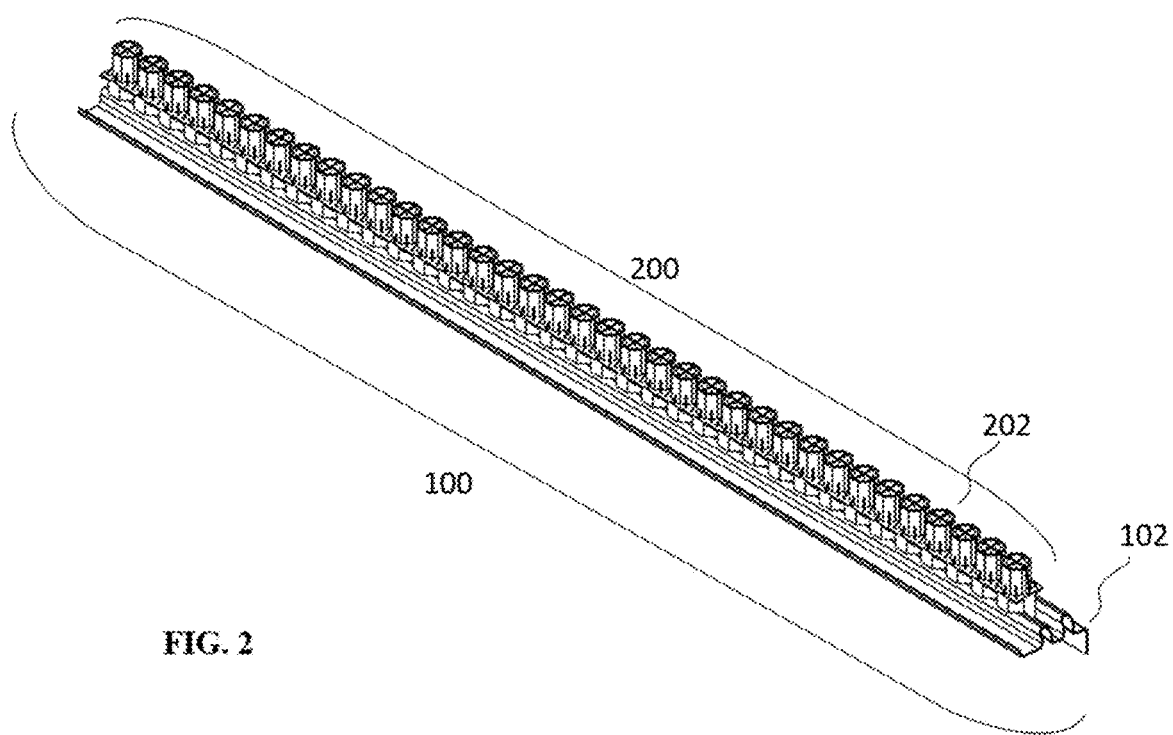
FIG. 2 is an isometric view of the energy absorbing side rail from FIG. 1 with certain components removed.

Referring to FIGS. 1-2, according to one embodiment, the energy absorbing side rail assembly 100 includes an inner rail 102, and an outer rail 104. Inner rail 102 and outer rail 104 are fixedly coupled together to form a cavity. An energy absorber array 200 includes at least one energy absorber 202 and is housed within the cavity formed by inner rail 102 and outer rail 104 and coupled to the inner rail. In some embodiments, outer rail 104 is comprises an outer rail top portion 106, an outer rail bottom portion 108, and an outer rail outside portion 110.

In one embodiment, the inner rail 102 is the innermost component of energy absorbing side rail assembly 100 and fixedly couples to the vehicle that energy absorbing side rail assembly 100 protects. The geometry of inner rail 102 is designed to conform to a protected vehicle component and may be adapted to various other vehicle components. In some embodiments, the inner rail 102 couples directly to a battery box of a vehicle. In some embodiments, the inner rail 102 may be manufactured from roll formed metal. Because of the modularity and ease of adjustment of the roll forming process, roll forming the inner rail 102 increases manufacturability and allows for precision tuning. Precision tuning allows the manufacturer to control the precise thickness and shape of the inner rail 102. This results in a component that provides a desired performance and reduces weight by only including needed material. The inner rail 102, however, may also be manufactured using other methods (e.g., stamping, extrusion, etc.)

In some embodiments, the inner rail 102 maybe be manufactured from a steel ranging from mild steel to martensitic steel (e.g., up to 1700 MPa) yield strength. In some embodiments, martensitic steel is used to provide desired stiffness while still being roll form capable. In other embodiments, aluminum can be used as a lightweight alternative.

The energy absorbing side rail assembly 100 also includes an outer rail 104. The outer rail 104 couples with inner rail 102 defining a cavity in which energy absorber(s) are located. The outer rail 104 provides the energy absorbing side rail assembly 100 with a closed housing such that the energy absorber(s) are in position and prepared to accommodate a collision. The outer rail 104 includes an outer rail top portion 106, an outer rail bottom portion 108, and an outer rail outside portion 110.

In some embodiments, the components of outer rail 104 may be manufactured from roll formed metal. Roll forming the components of outer rail 104 has the same benefits as discussed above in roll forming inner rail 102. In other embodiments, the outer rail 104 components may be manufactured using other methods (e.g., stamping, extrusion, etc.).

In some embodiments, the components of outer rail 104 may be manufactured from a steel ranging from mild steel to martensitic steel (e.g., up to 1700 MPa yield strength). Martensitic steel is the preferred material for providing optimal stiffness while still roll form capable. While steel is preferred, aluminum can be used as a lightweight alternative.

In some embodiments, outer rail 104 may be manufactured out of any number of components. The component(s) of outer rail 104 may be adjusted and designed for a number of configurations depending on the application. These component(s) are coupled together to form outer rail 104.

FIG. 2 depicts the energy absorbing side rail assembly 100 of FIG. 1 with the outer rail 104 removed, exposing the energy absorber array 200, according to one embodiment. The energy absorber array 200 is coupled to the inner rail 102.

In some embodiments, the configuration of the energy absorber array 200 within energy absorbing side rail assembly 100 may be adjusted to protect a vehicle component. Adjusting spacing and placement of energy absorber array 200 to correspond with areas requiring additional protection allows for desired energy absorption while reducing weight from unnecessary or redundant energy absorbers.

In one embodiment, the energy absorber array 200 includes multiple energy absorbers 202. Each of the energy absorbers 202 couples with inner rail 102. The energy absorbers 202 are designed to absorb as much energy as possible during a collision while being as lightweight as possible. The energy absorbers 202 may be designed to fit snuggly into a cavity defined by inner rail 102 and outer rail 104.

In some embodiments, the energy absorbers 202 are formed of plastic. Plastics are lighter than metal and are often less costly to produce. In one embodiment, the plastic utilized for the energy absorbers 202 is a polyphenylene ether and polyamide (PPE+PA) blend. PPE+PA blends have high energy absorption properties, which is helpful for use in an energy absorber. PPE+PA blends are also able to withstand the electrostatic coating process, the benefits of which are discussed above. This allows the entire energy absorbing side rail assembly 100 to be processed in a typical body structure coating system. In other alternative embodiments, other plastic materials (e.g., resins, etc.) may be used.

In some embodiments, the energy absorbers 202 are manufactured using injection molding. Injection molding is a manufacturing process where a molten raw material is injected into a mold. The material cools and hardens inside the mold forming the desired shape. One benefit of injection molding is that the molds can be adjusted such that the geometry and thicknesses of the energy absorbers can be tuned easily by forming a new mold. This process allows for achieving a desired energy absorption while minimizing weight.

In some embodiments, various characteristics of the energy absorbers 202 can be modified to maximize the absorption of energy. This includes, but is not limited to, modification of shape, thickness, and/or density.

In some embodiments, the energy absorbers 202 in energy absorber array 200 may be non-uniform in shape or other characteristics. The characteristics of the energy absorbers 202 within the energy absorber array 200 may vary to protect the vehicle component in a desired fashion. These differences can save weight where more energy absorption is not needed and have stronger energy absorbers 202 where additional protection is needed.

Figure 3:
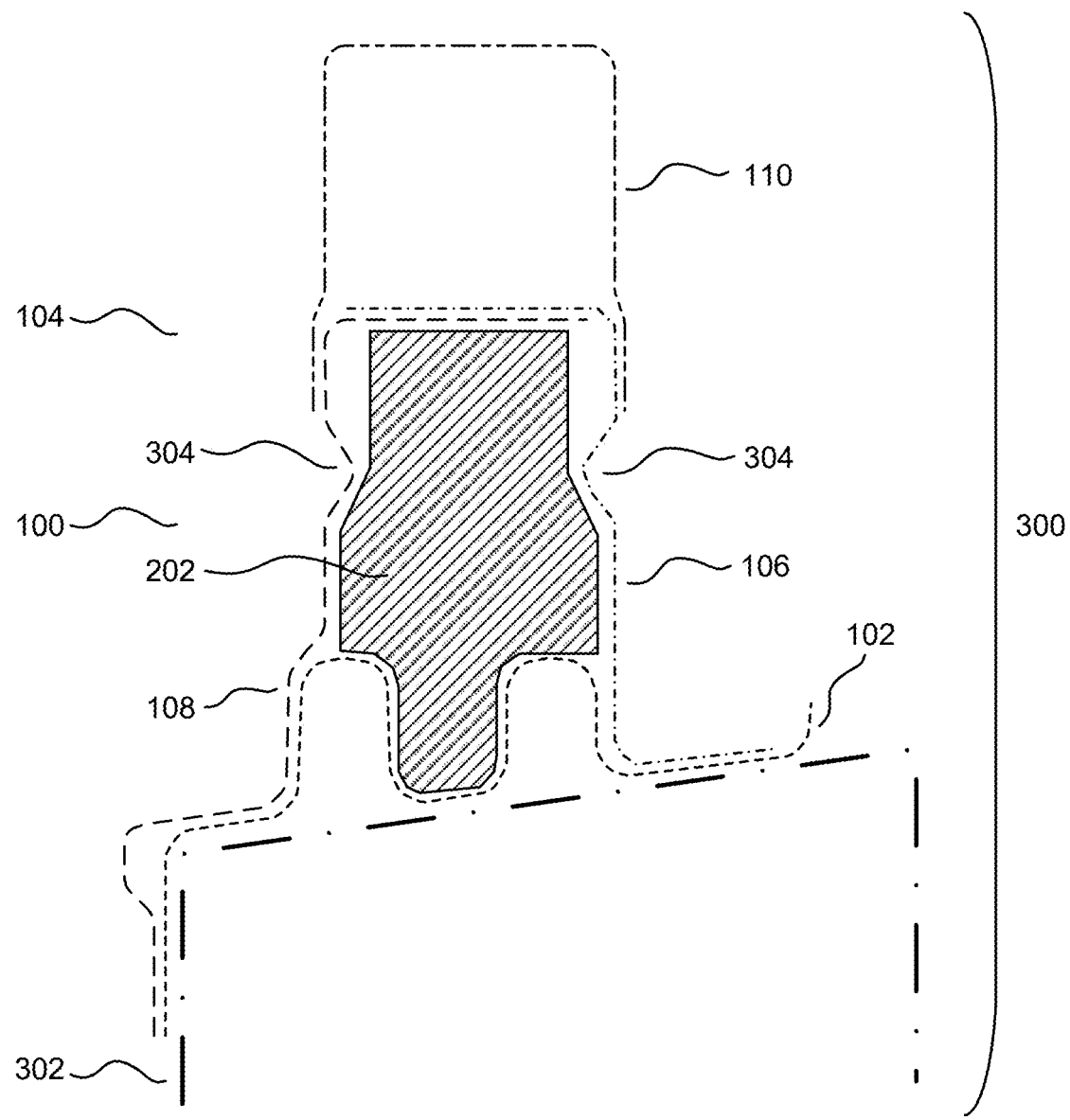
FIG. 3 is a section view of the energy absorbing side rail from FIG. 1.

FIG. 3 depicts a section view of the energy absorbing side rail assembly 100 according to one embodiment. As shown in FIG. 3, inner rail 102, outer rail 104, and energy absorbers 202 couple together to form the energy absorbing side rail assembly 100. For example, in one embodiment, inner rail 102 and outer rail 104 collectively define an internal cavity into which the energy absorber array 200 is received. Inner rail 102 may define a channel into which energy absorbers 202 are received (e.g., via a friction fit, etc.). The shape of the channel may be configured to provide a press-fit for the energy absorbers 202. For example, as shown in FIG. 3, inner rail 102 includes two raised or projecting sections that form a channel there between. The outer rail 104 may be at least partially U-shaped to facilitate forming the cavity in which the energy absorber array 200 is received.

In some embodiments the inner rail 102 and outer rail 104 are made of metal and the energy absorbers 202 are made of plastic. The combination of metal and plastic forming a hybrid energy absorbing side rail assembly 100 results in an assembly that maximizes energy absorption and minimizes weight. The strength and structure of the metal components allow for a rigid system that is primed to absorb a collision, while the plastic components are lightweight and can absorb a substantial amount of energy. Such a hybrid energy absorbing side rail assembly 100 may cost less than products using existing technologies, such as extruded aluminum side rails.

FIG. 3 further depicts how outer rail top portion 106, outer rail bottom portion 108, and outer rail outside portion 110 couple together to form outer rail 104. FIG. 3 also depicts how inner rail 102 is coupled with outer rail 104 defining the cavity in which energy absorbers 202 are located. The shapes of inner rail 102, outer rail 104, and the energy absorbers 202 are all interrelated to orient the energy absorbing side rail assembly 100.

FIG. 3 also depicts component interface 300 according to one embodiment. Energy absorbing side rail assembly 100 couples (e.g., fixedly couples) to a vehicle component 302. As shown in FIG. 3, the shape of the portion of the energy absorbing side rail assembly 100 that interfaces with vehicle component 302 at least partially conforms to the profile of the vehicle component 302. This ensures a snug fit and positions the energy absorbing side rail assembly 100 optimally.

In some embodiments, the energy absorbing side rail assembly 100 may be chemically coupled (e.g., via glue, cement, etc.) or mechanically coupled (e.g., via nut and bolt, fastener, etc.) to the vehicle component 302. Fixedly coupling the energy absorbing side rail assembly 100 to the vehicle component 302 ensures that the energy absorbing side rail assembly 100 will be optimally positioned to absorb energy during a collision and withstand vibrations and forces associated with regular vehicle operations.

FIG. 3 also shows triggers 304 on outer rail 104 according to one embodiment. The energy absorbers 202 are positioned in-line with the triggers 304, such that, in the event of an impact, the triggers 304 guide the energy absorbers 202 into a desired crush orientation. In one embodiment, the desired orientation is when the energy absorbing contribution of the energy absorbers 202 is maximized. The triggers 304 are formed during the manufacturing process of outer rail 104. The size and position of the triggers 304 may be tuned to achieve the best crush orientation discussed earlier. In one embodiment, triggers 304 are recesses (e.g., grooves, indents, etc.) that are defined by and extend along all or a portion of the length of outer rail (e.g., along outer rail top portion 106 and outer rail bottom portion 108).

Figure 4:
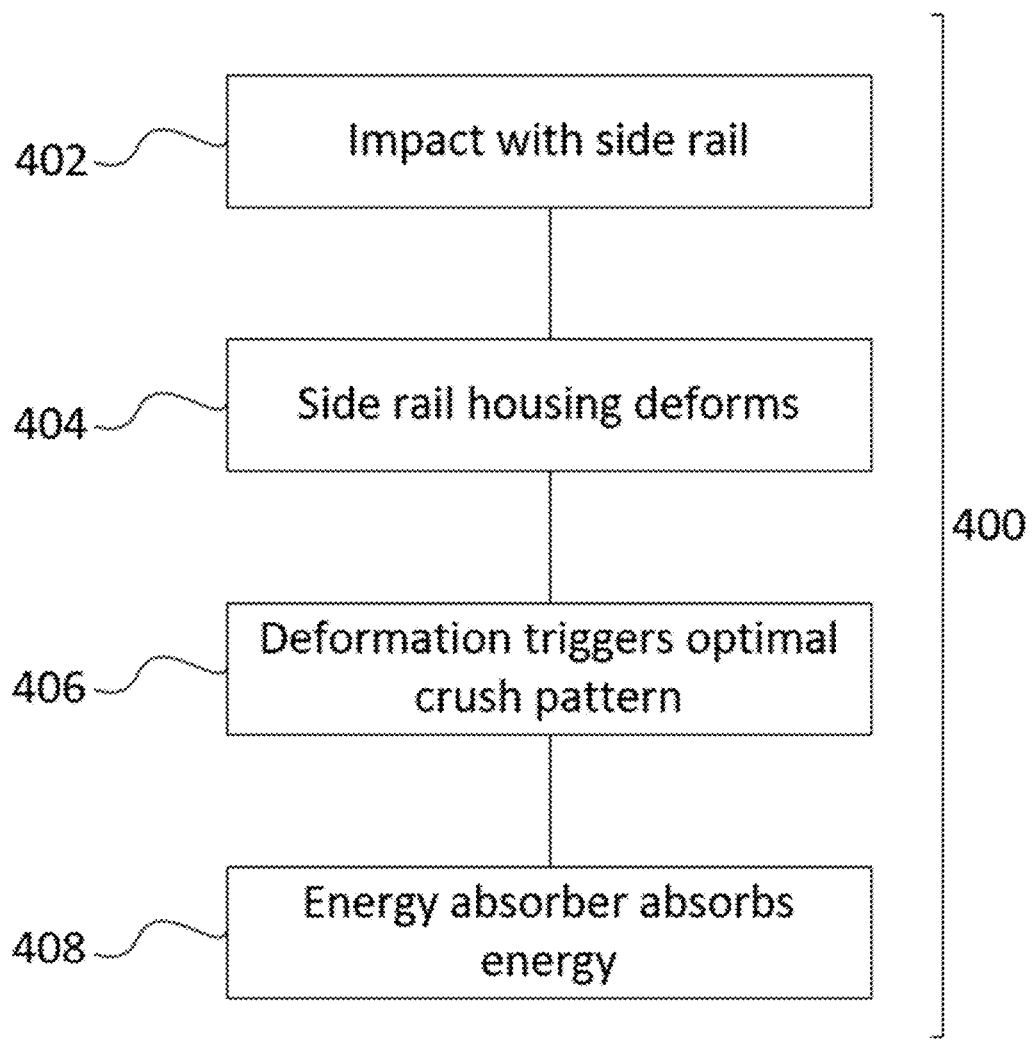
FIG. 4 is a block diagram of steps associated with an impact with an energy absorbing side rail according to an exemplary embodiment.

FIG. 4 depicts a block diagram for an energy absorption method 400 of a side rail absorbing energy during an impact according to one embodiment. Energy absorption method 400 includes an impact (step 402). The impact may be any type of impact (e.g., side pole type or similar impact) that has enough power to deform a side rail. Energy absorption method 400 also includes deformation of the side rail (step 404), during which the side rail that received the impact deforms under the pressure of the collision. During deformation, triggering occurs (step 406). As described above, triggering deforms the side rail such that energy absorbing component(s) of a side rail are guiding into a desired crush pattern. Energy absorption method 400 further includes energy absorption (step 408), during which the energy absorbing component(s) absorb at least some of the energy of the impact. It should be noted that step 408 may occur concurrently with various other steps of method 400.

Figure 5:
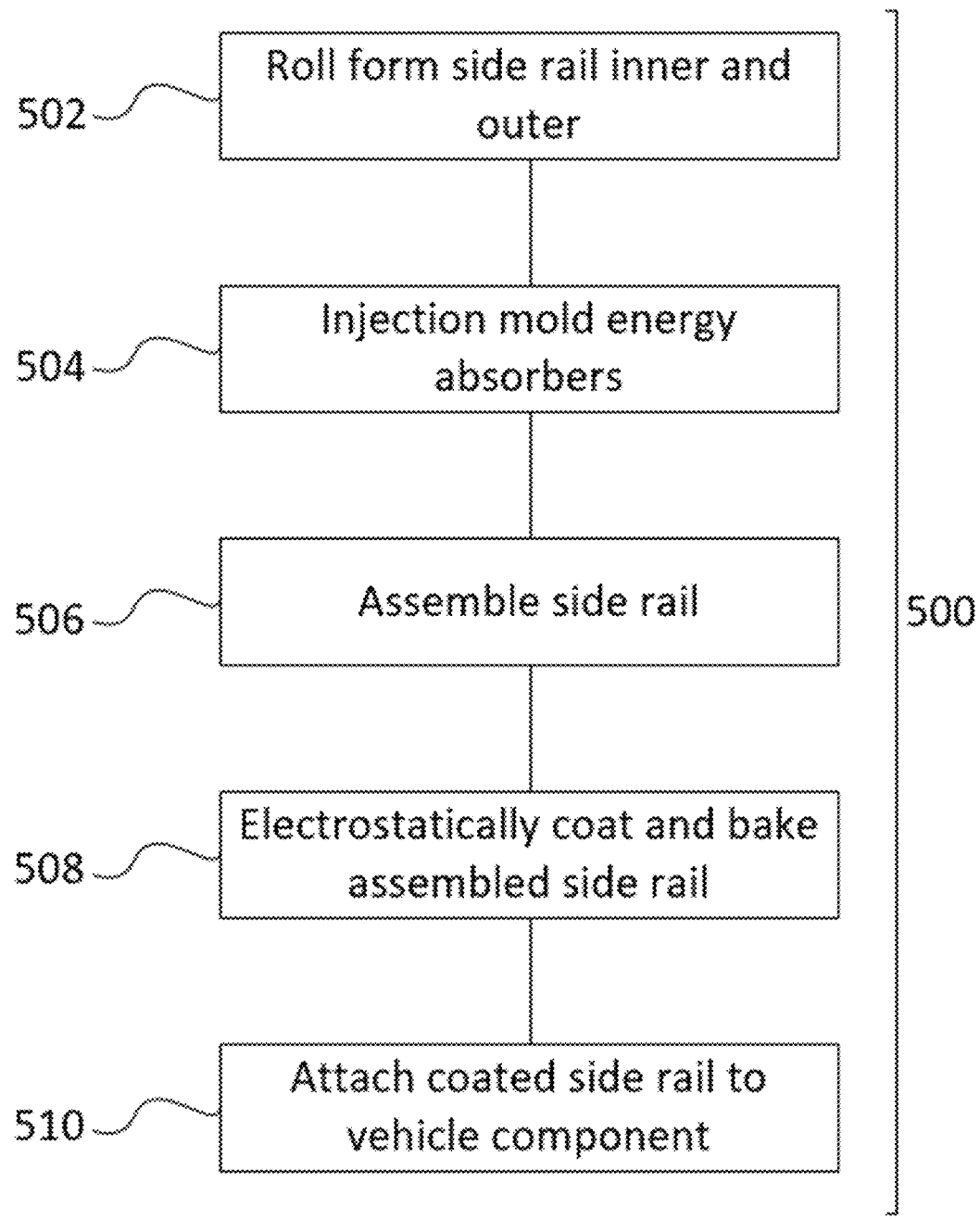
FIG. 5 is a block diagram of a method of manufacturing an energy absorbing side rail according to an exemplary embodiment.

FIG. 5 depicts a manufacturing method 500 for manufacturing and assembling an energy absorbing side rail according to one embodiment. The manufacturing process of the side rail ensures the side rail maximizes energy absorption and minimizes weight. The manufacturing process also ensures that the components all cooperate and provide desired energy absorption. Method 500 includes roll forming the inner and outer rails (step 502), during which the inner and outer structural components of the energy absorbing side rail are manufactured through roll forming. Method 500 includes injection molding the energy absorbers (step 504). Method 500 includes assembling the roll formed components from roll forming step 502 and the injection molded energy absorbers from step 504 are to form an energy absorbing side rail (step 506). This step may include, for example, coupling the energy absorbers to the inner rail, forming the cavity within which the energy absorbers are received, etc. Method 500 includes coating the energy absorbing side rail (step 508) where the side rail is coated and then baked. In some embodiments, the coating may be electrostatic coating (e.g., e-coating). Method 500 includes coupling the electrostatically coated energy absorbing side rail to a vehicle component (step 510). Once method 500 is completed, the side rail is ready for use.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that any element disclosed in one embodiment may be incorporated or utilized with any other embodiment disclosed herein. For example, the energy absorber of the exemplary embodiment described in reference to FIG. 2 may be incorporated in the characteristic changes of the exemplary embodiment described in at least FIG. 5. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An energy absorbing side rail, comprising:
   an inner rail;
   an outer rail comprising a top portion, a bottom portion, and an outside portion extending outward from the top portion and the bottom portion, the outer rail fixedly coupled to the inner rail forming a cavity defined by the inner rail, the top portion, and the bottom portion, and wherein the outer rail defines triggers extending along at least a portion of the outer rail; and
   at least one energy absorber coupled to the inner rail and housed in the cavity, the inner rail comprising two raised projections defining a channel, the channel being configured to retain the at least one energy absorber via a press fit, wherein the at least one energy absorber is positioned in-line with the triggers.

2. The energy absorbing side rail of claim 1, wherein the at least one energy absorber is formed of a plastic.

3. The energy absorbing side rail of claim 2, wherein the at least one energy absorber is formed of a polyphenylene ether and polyamide blend.

4. The energy absorbing side rail of claim 1, wherein the inner rail and the outer rail are formed of martensitic steel.

5. The energy absorbing side rail of claim 1, wherein the inner rail and the outer rail are formed of aluminum.

6. The energy absorbing side rail of claim 1, wherein the triggers are defined on the bottom portion and the top portion.

7. An energy absorbing side rail assembly, comprising:
   a vehicle;
   an inner rail coupled to the vehicle;
   an outer rail comprising a top portion, a bottom portion, and an outside portion extending outward from the top portion and the bottom portion, the outer rail coupled to the inner rail forming a cavity defined by the inner rail, the top portion, and the bottom portion, and wherein the outer rail defines triggers extending along at least a portion of the outer rail; and
   at least one energy absorber housed in the cavity, and coupled to the inner rail, the inner rail comprising two raised projections defining a channel, the channel being configured to retain the at least one energy absorber via a press fit, wherein the at least one energy absorber is positioned in-line with the triggers.

8. The assembly of claim 7, wherein the inner rail is coupled to the vehicle mechanically.

9. The assembly of claim 7, wherein the inner rail is coupled to the vehicle chemically.

10. The assembly of claim 7, wherein the inner rail conforms to the shape of a vehicle component of the vehicle.

11. The assembly of claim 10, wherein the vehicle component is a battery box.

12. The assembly of claim 11, wherein the inner rail is coupled to the battery box.

13. A method of forming an energy absorbing side rail, the method comprising:
   forming an inner rail and an outer rail, wherein the outer rail comprises a top portion, a bottom portion, and an outside portion extending outward from the top portion and the bottom portion;

forming at least one energy absorber;

assembling the inner rail and the outer rail to form a cavity, the cavity defined by the inner rail, the top portion of the outer rail, and the bottom portion of the outer rail; and positioning at least one energy absorber within the cavity to form an energy absorbing side rail, wherein positioning the at least one energy absorber within the cavity comprises positioning the at least one energy absorber within a channel defined by the inner rail, the channel formed by two raised projections within the inner rail, and coupling the at least one energy absorber to the inner rail, the channel configured to retain the at least one energy absorber via a press fit.

14. The method of claim 13, further comprising coating the energy absorbing side rail to form a coated energy absorbing side rail.

15. The method of claim 14, wherein coating the energy absorbing side rail includes electrostatic coating.

16. The method of claim 13, wherein forming the inner rail and the outer rail includes roll forming.

17. The method of claim 13, wherein forming the at least one energy absorber includes injection molding.

18. The method of claim 13, further comprising coupling the energy absorbing side rail to a vehicle component.

* * * * *